United States Patent [19]

Gladd et al.

[11] Patent Number: 5,709,567

[45] Date of Patent: Jan. 20, 1998

[54] PRESS FIT STAMPED BUSS

[75] Inventors: Joseph Howard Gladd, Cortland, Ohio; Frederick Edward Mlakar, Hermitage, Pa.

[73] Assignee: General Motors Corporation, Detroit, Mich.

[21] Appl. No.: 690,406

[22] Filed: Jul. 25, 1996

[51] Int. Cl.$^6$ ................................................ H01R 4/26
[52] U.S. Cl. ............................................ 439/444; 439/949
[58] Field of Search ...................................... 439/76.2, 949, 439/733.1, 78, 869, 395, 721, 723, 724, 212, 444, 891; 174/70 B, 71 B, 72 B

[56] References Cited

U.S. PATENT DOCUMENTS

| | | | |
|---|---|---|---|
| 3,095,470 | 6/1963 | Dozier | 439/733.1 |
| 4,035,047 | 7/1977 | Ammon | 439/78 |
| 4,652,074 | 3/1987 | Lombardi | 439/733.1 |
| 4,684,765 | 8/1987 | Beck et al. | 174/68.5 |
| 4,995,818 | 2/1991 | Saimoto | 439/76.2 |
| 5,023,752 | 6/1991 | Detter et al. | 361/399 |
| 5,207,587 | 5/1993 | Hamill et al. | 439/76 |

*Primary Examiner*—Neil Abrams
*Assistant Examiner*—T C Patel
*Attorney, Agent, or Firm*—Gary W. Brooks

[57] ABSTRACT

An assembly for conveying electricity comprising a stamped electrical buss plate having a slot formed therein, and an electrical terminal having a body portion and an upwardly extending prong portion, said body portion having raised features, said terminal being inserted in said stamped electrical buss plate slot so that said raised features engage the edges of said buss plate defining said slot.

13 Claims, 4 Drawing Sheets

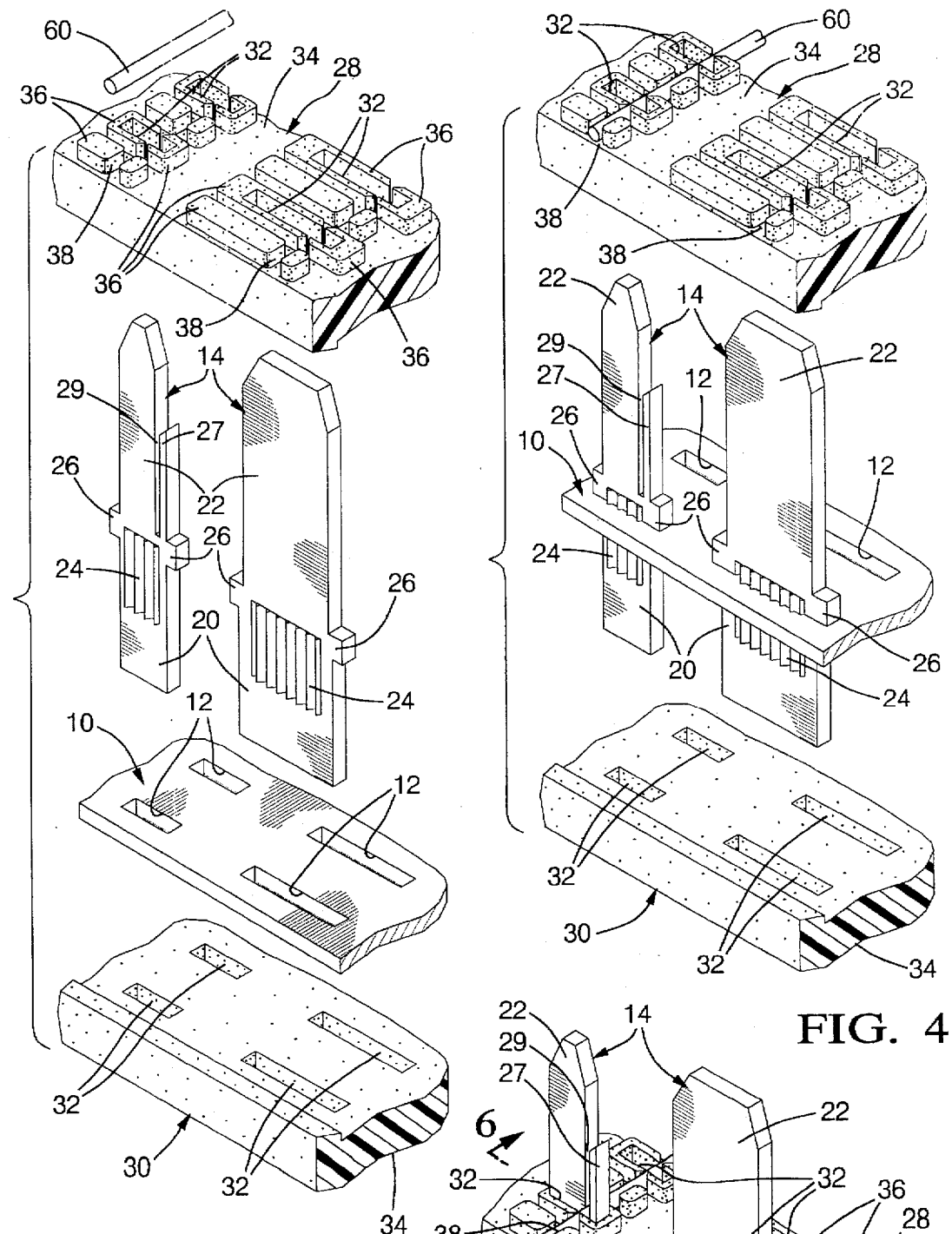
FIG. 3
FIG. 4
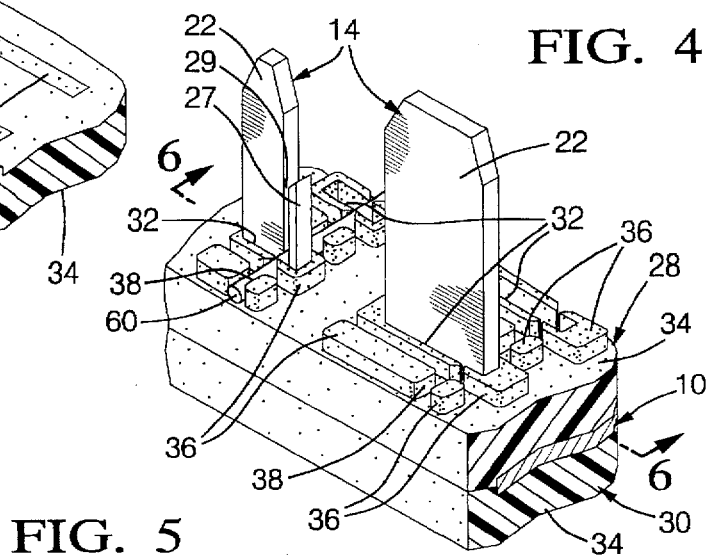
FIG. 5

PRESS FIT STAMPED BUSS

FIELD OF THE INVENTION

This invention relates generally to stamped electrical buss systems and more particularly to a stamped electrical buss system for an electrical distribution center.

BACKGROUND OF THE INVENTION

Stamped electrical buss systems are widely used, and in particularly in electrical distribution centers for automobiles. The high current bussing used in prior buss electrical centers consisted of a metal stamping insert molded and sandwiched between two isolating plates. The buss is then powered by a leaded ring terminated from the automobile battery, or powered through a harness connection. The metal stampings are arranged so that the high current can be bussed to fuses and relays or out harness connections to switch other powered devices. These single-piece stampings have male blades formed up or down as required.

However, there are numerous drawbacks to this prior technology. First, the tooling that makes the part is very expensive and changes are costly. Second, the dimensional tolerances for the formed terminals are often hard to control. Third, the formed stampings are hard to handle when placed in a mold and are easily tangled during shipping and processing.

The present invention provides alternatives and advantages over the prior art.

SUMMARY OF THE INVENTION

This invention includes a stamped electrical buss system including a stamped buss plate having a plurality of slots formed therein and a terminal having raised features that cause an electrical interconnection between the buss plate and the terminal. The terminal also includes outwardly extending tabs that provide a positive stop for the terminal as it is inserted into the buss plate. These raised features or corrugated ribs are designed so that as the terminal is inserted into the stamped plate, the ribs displace the edges of the plate defining the slot and provide a gas-tight electrical interface. The spacing of the raised features or corrugations are compressed as close as possible to provide as many peak contact points as possible. As a result of these multiple contacts, the power circuits have less resistance at the raised features or corrugated interface and consequently convey the electrical current at lower temperatures.

These and other objects, features and advantages will become apparent from the following brief description of the drawings, detailed description, and appended claims and drawings.

BRIEF DESCRIPTION OF THE DRAWINGS

FIG. 3 is an enlarged exploded view of a buss plate, terminal and two-piece isolation plates of the present invention;

FIG. 4 is a view similar to FIG. 3 and wherein the terminals have been inserted into the buss plate according to the present invention;

FIG. 5 illustrates the buss plate, terminals and isolation plate in an assembled configuration according to the present invention;

DETAILED DESCRIPTION

Figure 1:
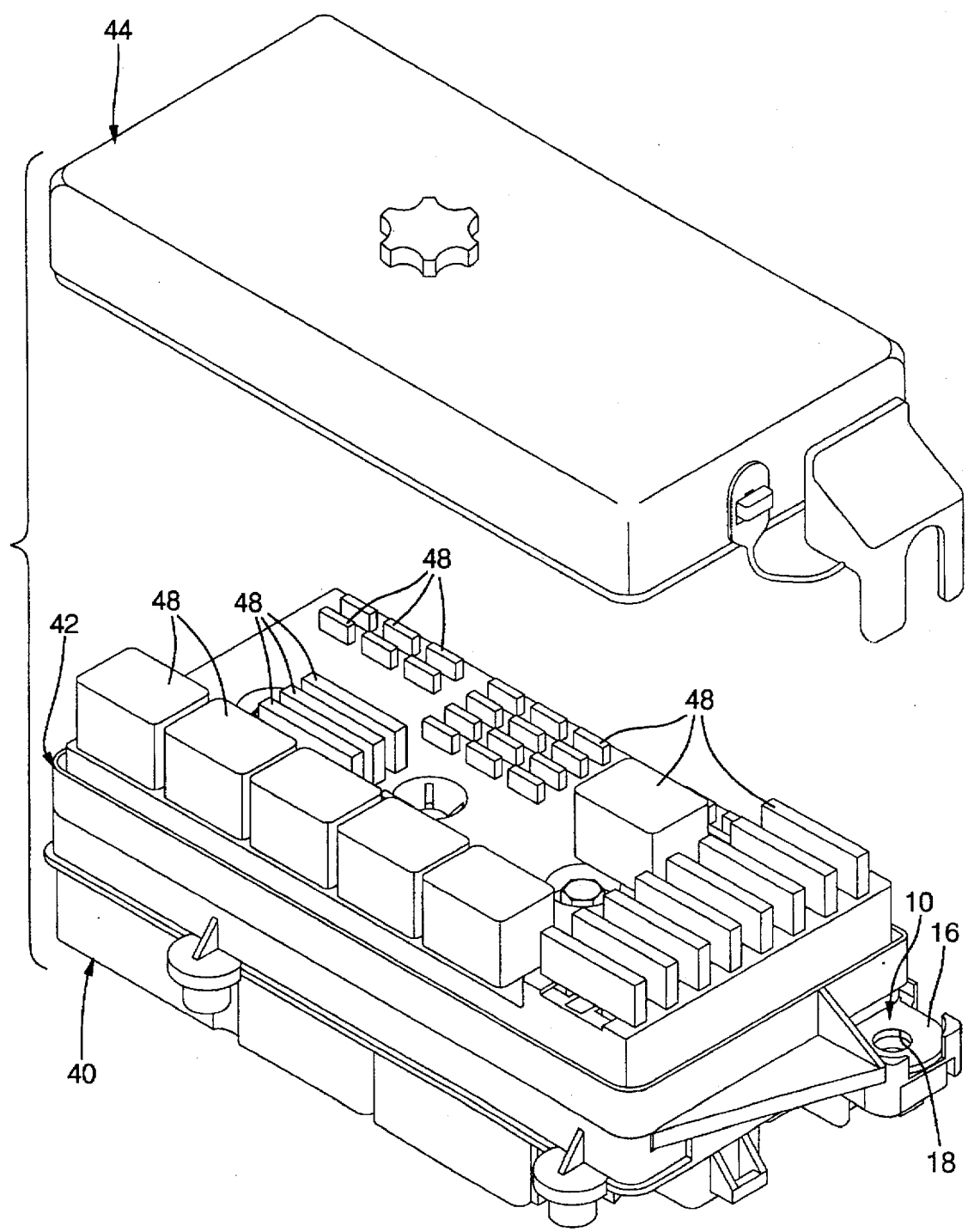
FIG. 1 is a perspective exploded view of a buss electrical center according to the present invention.

FIGS. 3–4 illustrate a stamped electrical buss plate 10 of the present invention having a plurality of slots 12 formed therein for receiving electrical terminals 14. The stamped electrical buss plate may also include an ear portion 16 having a hole 18 (FIG. 1) formed therein for connection to the battery or the like.

Figure 8:
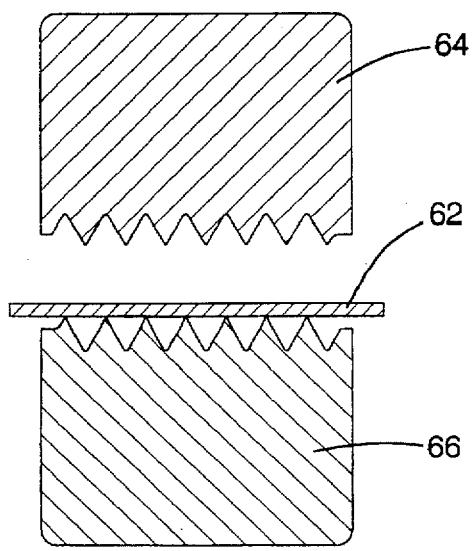
FIGS. 8–9 illustrate a process of making corrugated ribs in a terminal according to the present invention.
Figure 9:
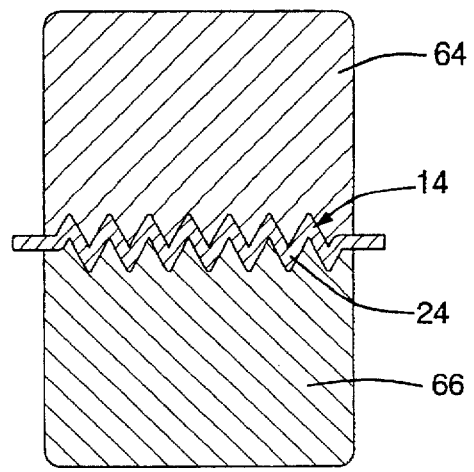

According to the present invention, the terminal 14 includes a body portion 20 and an elongated terminal portion 22 extending upward therefrom. The body portion 20 is substantially flat but includes raised features or corrugated ribs 24 are formed in the body portion 20 on the terminal. Tabs or wings 26 extend outwardly from opposite edges of the body portion 20 of the terminal to provide a positive stop against the stamped electrical buss plate 10. A plurality of terminals may be provided by a single piece wherein adjacent terminals have a common tab. If desired a plurality of separate individual terminals are made by cutting through a common tab as shown in assignee's copending patent application Attorney Docket No. H-182282, by Brussalis et al, entitled "Electrical Distribution Center with Two-Piece Insulation Assembly," the disclosure of which is hereby incorporated by reference. The terminal may include a finger 27 extending up from the body portion 20 and spaced apart from the elongated terminal portion (male plate) 22 to define a slot 29. The slot 29 has a width narrower than a wire 60 to be frictionally received therein. The corrugated ribs are formed by pressing a flat terminal stamping 62 between die halves 64, 66 having mating corrugated surfaces (FIGS. 8–9).

The corrugated ribs are designed so that as the terminal is inserted into the stamped plate, the ribs displace the edges of the plate defining the hole and provide a gas tight electrical interface. The spacing of the corrugations is compressed as close as possible to provide as many peak contact points as possible. The intention is that with multiple contacts the powered circuits will have less resistance at the corrugated interface and consequently convey the electrical current at lower temperatures. By having the components run at lower temperatures, the electrical interface will be less likely to stress relax the press fit junction, and protect the surrounding plastic from melting or deforming. To add additional electrical contacts, the terminal is designed to interfere with the ends and corners of the punched holes in the stamp plate. The corrugations were designed so that no material is sheared thus disrupting the current flow and causing a temperature rise at the interface. The goal of this interface is to run cooler and to provide as much current flow as possible. The maximum current could run as high as 80 amps in a 60 amp fuse blow situation.

The buss plate with inserted terminal is sandwiched between an upper insulation plate 28 and a lower insulation plate 30. Each insulation plate has slots 32 for receiving opposite ends of the terminal respectively. Upon an outer surface 34 of each insulation layer 28, 30, is a grid pattern designed to accept a 20 gage copper wire. The pattern includes islands 36 that raise above the planar surface 34 of the insulation plate. The islands are symmetrically patterned and adjacent islands are spaced apart from each other to define a linear channel 38 into which the wire is frictionally received. The wire is automatically routed into the grid pattern from one terminal cavity to another, thus providing an electrical connection between the two terminals. Located on the opposite side of the plate are slotted channels that envelope the corrugated terminal stops. This channel along with the corrugations embedded into the plastic cavity provide stability to the terminal to buss plate interface.

The following is a general description of the assembly process. The plastic insulation fit layer is placed upon a X/Y index table with the wire routed pattern face down. The stamp buss plate is then placed and located directly over the plastic routed plate and its cavities. Terminals will be fed off reels into an inserter tool which separates the carrier and shears off the proper tab stops. Once free of the reel, the nest move to the proper position and the terminal is inserted. The terminal is inserted to where the stop tabs meet the stamp buss plate.

Once the corrugated terminals are all seated in the buss plate the subassembly moves to another inserter where all the pass through terminals are inserted. When all the terminals have been inserted, the second insulation layer, with the wire routed surface face up, is placed over the nested subassembly and pressed, affixed, and electrically inspected. The two insulation layers 28, 30 can be press-fitted together in a manner described in assignee's copending patent application (Attorney Docket Number H-182282, entitled "Electrical Distribution Center with Two-Piece Insulation Assembly" by Brussalis et al. Where appropriate, the wire is thus received in the slot 29 defined between the finger 27 and the male blade 22 of the terminal and makes electric connection thereto. This completed assembly is then used as the main ingredient in a bussed electrical center assembly.

Figure 2:
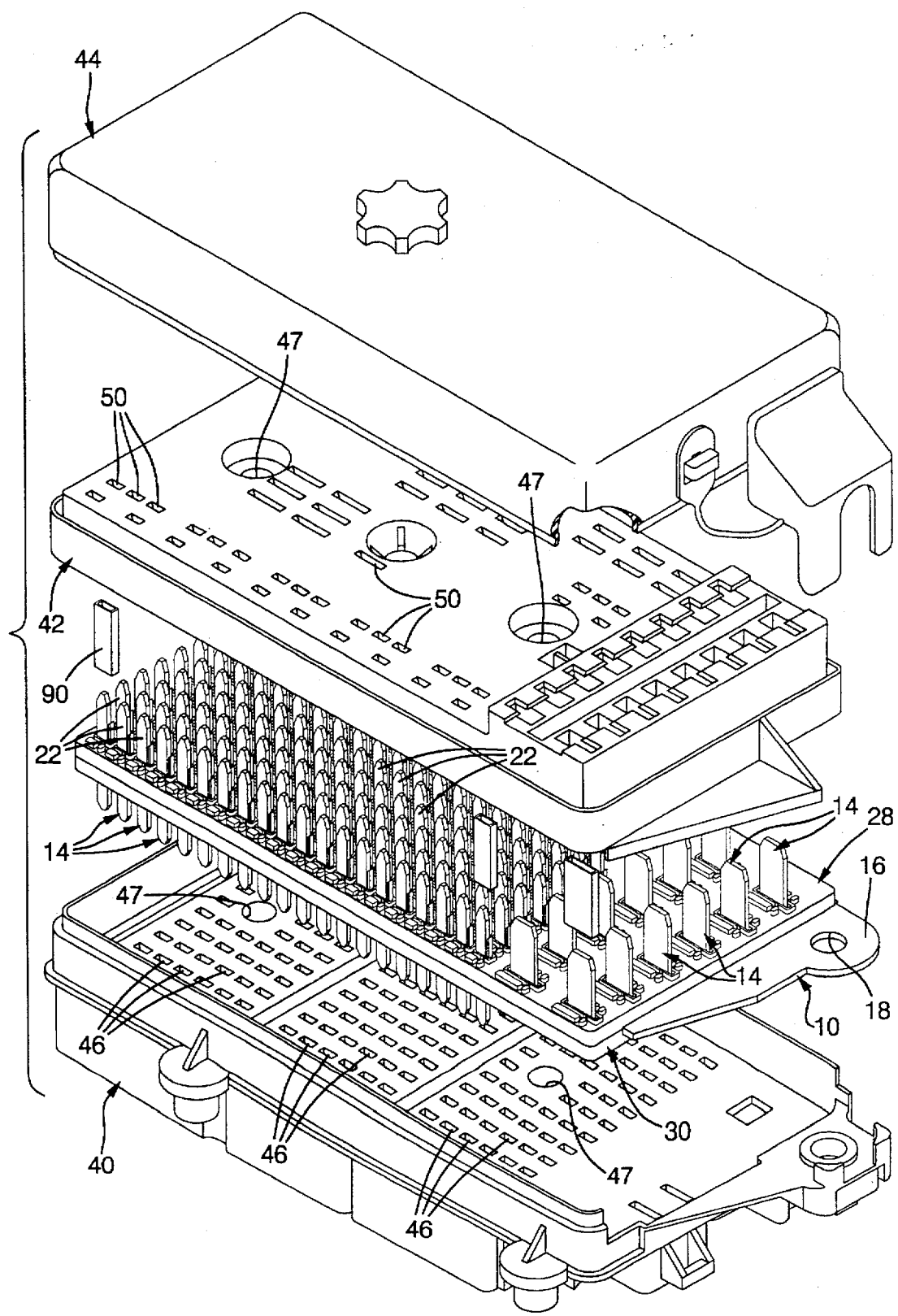
FIG. 2 is a perspective exploded view of a buss electrical center according to the present invention.
Figure 6:
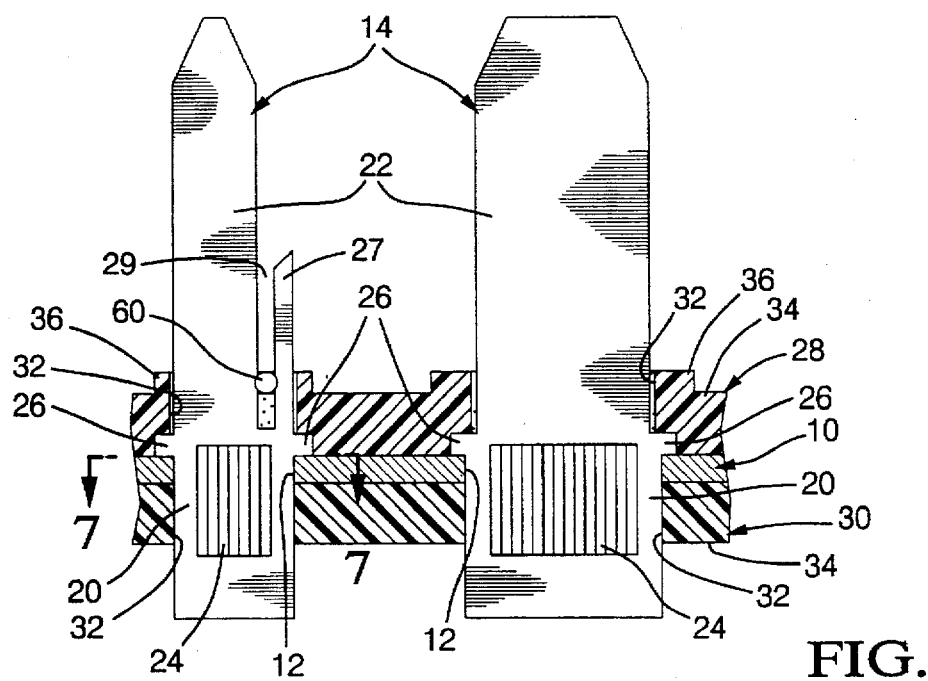
FIG. 6 is a sectional view taken along lines 6—6 of FIG. 5.
Figure 7:
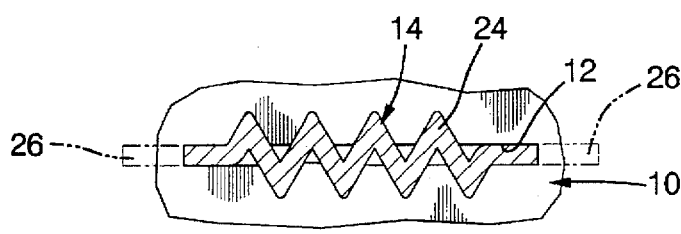
FIG. 7 is a sectional view taken along lines 7—7 of FIG. 6.

Referring to FIGS. 1-2, an electrical distribution center provides an electrical interconnect between electrical and electronic devices such as mini-fuses, maxi-fuses and relays that are plugged into the top of the electrical distribution center and the electrical connectors of wire harnesses that are plugged into a plurality of connector sockets in the bottom of the electrical distribution center.

The electrical distribution center typically includes the housings 40, 42 and a cover 44 that are molded from a thermal plastic electrically insulative material. The housings are comprised of a lower housing 40 and an upper housing 42 which fit together by bolts (FIG. 1) extending through holes 47 formed in the member, or by other suitable means. The connector sockets 46 for receiving electrical connectors of the wire harness utilized in automotive applications can be molded as an integral part of the lower housing. Mini-fuses, maxi-fuses, devices and relays 48 can be plugged into terminal cavities 50 in the upper housing and held in place by the cover when the cover is attached to the housing. Female-female connectors 90 may be provided to make connections from male blades 22 of the terminal to male prongs (not shown) of the devices 48. Such an arrangement is described in U.S. Pat. No. 5,023,752 that was granted to Gary C. Detter et al Jun. 11, 1992 for an Electrical Power Distribution Center, the disclosure of which is hereby incorporated by reference.

The electrical distribution center includes several components that are disposed within the housing as will be appreciated from FIGS. 2-6. This includes a two-piece main insulation assembly having upper and lower halves. A main stamped metal buss plate may be carried within the main insulation assembly as well as a plurality of other stamped metal circuit components which are press-fit into upper and lower halves of the main insulation assembly in a predetermined pattern. A variety of different types of stamped metal circuit components are usable in the current invention.

Upper and lower buss plates are provided by a routing board formed on the upper surface of the upper half of two-piece insulation assembly. This upper surface includes a plurality of terminal stations and a plurality of guide stations. The terminal and guide stations are raised features and are separated from each other so as to provide a network of wire channels that communicate with electrical components such as terminals extending through the half of the insulation assembly and that may extend through the terminal and guide stations. The terminal stations have terminal slots that extend through the upper half of the insulation assembly and intersect wire passages. Preferably the terminal station has two spaced apart raised features or islands. A space or path is provided between the island and enters the slot so that wire may be placed through the path and into the narrow slot of the terminal as described hereafter. Further, a plurality of wire starter recesses may be provided on the surface into which the end of a wire is inserted and bent at a right angle to hold the wire during the wire routing process. The lower half of the two-piece insulation assembly may have a bottom surface similar configured to the top surface of the upper half of the insulation assembly.

Upper and lower buss plates include electrical busses having links of electrically conductive wire that pass through various terminal and guide stations via the network of wire channels in a predetermined pattern. Suitable buss plates and a suitable method of their manufacture are disclosed in greater detail in U.S. Pat. No. 4,684,765 granted to Lawrence R. Beck et al Aug. 4, 1987 for a Buss Assembly and Method of Making the Same, the disclosure of which is hereby incorporated by reference.

The electrically conductive wire is used in the upper and lower buss plates is preferably a solid core copper wire that is as easily routed onto the routing surfaces or boards and also adequate to carry the relatively low current bussing between wire harnesses, i.e., up to 15 amps continuous current. As disclosed in the Beck patent, the routing of the wire onto the routing boards is an automatic process that can be programmed quickly to create any configuration of wire routing. Thus the low current bussing circuits that are most likely to change often from automotive wiring applications are created and changed easily with minimal costs and time. Further, the current invention utilizes two similar configured upper and lower halves of the insulation assembly which are standard and allow for reconfiguration of the main buss plate by moving the male blade or tuning fork terminals to different locations within the insulation assembly as desired. This is a major advantage over the prior art insert molded main buss plate which required major tooling changes and costs associated with changes in the main buss plate design.

What is claimed is:

1. An assembly for conveying electricity comprising:
   a stamped electrical buss plate having a slot formed therein, and an electrical terminal having a body portion and an upwardly extending prong portion, and raised features extending from the body portion comprising corrugated ribs,
   said terminal being inserted in said stamped electrical buss plate slot so that said raised features engage the edges of said buss plate defining said slot.

2. An assembly as set forth in claim 1 wherein said corrugated ribs are defined by material that is not sheared.

3. An assembly as set forth in claim 1 wherein said electrical terminal further includes a tab extending outward from opposite edges of the body portion to provide a positive stop against the stamped electrical buss plate.

4. An assembly as set forth in claim 1 wherein the corrugated ribs are designed to displace edges of the plate defining the slot to provide a gas tight electrical interface.

5. An assembly as set forth in claim 1 wherein said stamped electrical buss plate further comprises a plurality of slots, and further comprising a plurality of said terminals each being inserted in a respective slot wherein said raised features engage the edges of said buss plate defining said slot.

6. An assembly as set forth in claim 5 wherein the number of slots formed in said buss plate out number the number of terminals inserted in said buss plate.

7. An assembly as set forth in claim 5 wherein the upwardly extending prong portion of one of said terminals comprises a male blade.

8. An assembly as set forth in claim 5 wherein one of said terminals further comprises a finger extending upwardly from said body portion and spaced a distance from said male prong so that said male prong and said finger define a narrow slot constructed and arranged for frictionally receiving an electrical wire therein.

9. An assembly as set forth in claim 1 further comprising a two-piece mean insulation assembly having a first half with a slot formed therein for receiving said terminal and said upper half providing an insulation layer overlying at least a portion of said buss plate, and a lower half of said two-piece mean insulation assembly providing an insulation wire covering at least a portion of the bottom face of said stamped electrical buss plate, and wherein said upper and lower halves of the two-piece mean insulation assembly are connected together.

10. An assembly as set forth in claim 9 wherein one of said terminals extends upwardly from said stamped electrical buss plate, and further comprising a second terminal extending downwardly from said stamped electrical buss plate, and wherein said second half of the two-piece insulation assembly has a slot formed therein for receiving said second terminal therethrough.

11. An assembly as set forth in claim 10 wherein said second terminal further comprises a finger extending upwardly from said body portion and spaced a distance from said male prong to define a narrow slot for frictionally receiving a wire therethrough, and said lower half of the two-piece insulation assembly includes an outer surface having a plurality of terminal stations and guide stations that are raised and separated from each other so as to provide a network of wire channels, and further comprising an electrical wire received in one of said channels and received in said narrow slot of said second terminal.

12. An assembly as set forth in claim 1 further comprising an electronic device connected to said terminal.

13. An assembly as set forth in claim 12 wherein said electronic device is at least one selected from the group consisting of mini-fuses, maxi-fuses and relays.

* * * * *